(12) United States Patent
Otsuka et al.

(10) Patent No.: US 6,695,963 B2
(45) Date of Patent: *Feb. 24, 2004

(54) ORGANIC ELECTROLYSIS REACTOR FOR PERFORMING AN ELECTROLYTIC OXIDATION REACTION AND METHOD FOR PRODUCING A CHEMICAL COMPOUND BY USING THE SAME

(75) Inventors: Kiyoshi Otsuka, Toda (JP); Ichiro Yamanaka, Tokyo (JP); Ken Suzuki, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 86 days.

This patent is subject to a terminal disclaimer.

(21) Appl. No.: 09/971,927

(22) Filed: Oct. 9, 2001

(65) Prior Publication Data

US 2003/0070910 A1 Apr. 17, 2003

(30) Foreign Application Priority Data

Jul. 5, 2001 (JP) ........................................ 2001-204434

(51) Int. Cl.$^7$ .................................................. C25B 3/00
(52) U.S. Cl. ........................ 205/455; 205/413; 205/343
(58) Field of Search .............................. 205/413, 452, 205/343, 455

(56) References Cited

U.S. PATENT DOCUMENTS 5,246,551 A * 9/1993 Pletcher et al. ............... 204/96

2003/0029733 A1 * 2/2003 Otsuka et al. ............... 205/439

OTHER PUBLICATIONS

Cipris, D. et al., J. Electrochem. Soc., vol. 125, No. 12, pp. 1954–1959, Dec. 1978.
Otsuka, K. et al., Electrochimica Acta, vol. 39, No. 14, p. 2109–2115 (1994).
Otsuka, K. et al., J. Electrochem. Soc., vol. 142, No. 1, pp. 130–135 (1995).

* cited by examiner

Primary Examiner—Edna Wong
(74) Attorney, Agent, or Firm—Birch, Stewart, Kolasch & Birch, LLP

(57) ABSTRACT

Disclosed is an organic electrolysis reactor for performing an electrolytic oxidation reaction of a system comprising a substrate and a reductant, comprising: a casing; an anode which comprises an anode active material and which is ion-conductive or active species-conductive; a cathode which comprises a cathode active material and which is ion-conductive or active species-conductive; and means for applying a voltage between the anode and the cathode, wherein the means for applying a voltage is disposed in the outside of the casing and connected to the anode and the cathode, wherein the anode and the cathode are disposed in spaced relationship in the casing to partition the inside of the casing into an intermediate compartment between the anode and the cathode, and an anode compartment on the outside of the anode. Also disclosed is a method for producing a chemical compound by performing an electrolytic oxidation reaction of a system comprising a substrate and a reductant, using the organic electrolysis reactor mentioned above.

5 Claims, 2 Drawing Sheets

ORGANIC ELECTROLYSIS REACTOR FOR PERFORMING AN ELECTROLYTIC OXIDATION REACTION AND METHOD FOR PRODUCING A CHEMICAL COMPOUND BY USING THE SAME

BACKGROUND OF THE INVENTION

1. Field of the Invention

The present invention relates to an organic electrolysis reactor for performing an electrolytic oxidation reaction. More particularly, the present invention is concerned with an organic electrolysis reactor for performing an electrolytic oxidation reaction of a system comprising a substrate and a reductant, comprising: a casing; an anode which comprises an anode active material and which is ion-conductive or active species-conductive; a cathode which comprises a cathode active material and which is ion-conductive or active species-conductive; and means for applying a voltage between the anode and the cathode, wherein the means for applying a voltage is disposed in the outside of the casing and connected to the anode and the cathode, wherein the anode and the cathode are disposed in spaced relationship in the casing to partition the inside of the casing into an intermediate compartment between the anode and the cathode, and an anode compartment on the outside of the anode.

By using the organic electrolysis reactor of the present invention to perform an electrolytic oxidation reaction, such as an electrolytic carbonylation reaction, various useful chemical compounds, for example a carbonic diester, can be produced efficiently, safely and stably, with high selectivity under moderate conditions.

The organic electrolysis reactor of the present invention can solve the various problems of a non-electrolytic oxidation reaction which is performed by using a catalyst, i.e., the problems that a deterioration of a catalyst occurs, that the selectivity for and yield of a desired product become low, that complicated operations are necessary, and that a large amount of energy is consumed.

For example, when the production of a carbonic diester from carbon monoxide and an alcohol by an electrolytic carbonylation reaction is performed by using the organic electrolysis reactor of the present invention, there can be obtained advantages not only in that the carbonic diester can be produced efficiently, with high selectivity and at low cost under moderate conditions, but also in that the reactor of the present invention can solve the various problems of the conventional methods for producing a carbonic diester, such as the problems that the use of phosgene (which is poisonous) is necessary, that a corrosion of a reactor by a by-produced chlorine-containing compound occurs, that a deterioration of a catalyst occurs, that there occurs formation of a dangerous, explosive mixture of a starting material with oxygen, and that the selectivity for and yield of a desired carbonic diester become low.

The organic electrolysis reactor of the present invention can be used not only for performing an electrolytic carbonylation reaction, but also for performing electrolytic oxidation reactions other than an electrolytic carbonylation reaction, such as oxidation of an alkane, oxidation of an alcohol, epoxidation of an olefin, oxidation of a benzylic site, oxidation of an allylic site, oxidation of an aromatic ring of an aromatic hydrocarbon, oxidation of a sulfur compound and oxidation of a nitrogen compound. In addition, the organic electrolysis reactor of the present invention can also be used for performing an oxidative addition reaction by electrolysis, with respect to such a type of oxidative addition reaction as conventionally, usually performed by a non-electrolytic method.

The present invention is also concerned with a method for producing a chemical compound by performing an electrolytic oxidation reaction, using the organic electrolysis reactor mentioned above.

2. Prior Art

There are an extremely wide variety of oxidation reactions. One of such oxidation reactions is an electrolytic oxidation reaction.

An oxidation reaction using an electrolysis can be performed as follows. An anode and a cathode are placed in an electrolyte solution containing a substance to be oxidized. A voltage is applied between the anode and the cathode to thereby electrolyze the substance, so that the substance is oxidized at the anode. Such an oxidation reaction using an electrolysis is called an "electrolytic oxidation reaction". In some cases, an oxidation reaction which hardly proceeds under ordinary reaction conditions not utilizing an electrolysis can easily proceed by electrolytic oxidation. Therefore, the electrolytic oxidation reaction is extremely useful.

The electrolytic oxidation is applicable to an extremely wide variety of oxidation reactions, such as oxidation of an alkane, oxidation of an alcohol, epoxidation of an olefin, oxidation of a benzylic site, oxidation of an allylic site, oxidation of an aromatic ring of an aromatic hydrocarbon, oxidation of a sulfur compound, and oxidation of a nitrogen compound.

Further, the electrolytic oxidation reaction is also applicable to oxidation reactions which are collectively referred to as the "oxidative addition reaction" and which are usually performed by a non-electrolytic method. Examples of such oxidative addition reactions include the Wacker reaction for the synthesis of an aldehyde and a ketone from an olefin, acetoxylation, oxychlorination or oxycyanation of an olefin or an aromatic hydrocarbon, a coupling reaction of an olefin or an aromatic hydrocarbon, and a reaction for the synthesis of an ester from an alcohol (see, for example, "Shokubai Koza Vol. 8, (Kogyo Shokubai Hannohen 2), Kogyo Shokubai Hanno I (Lecture on Catalysts Vol. 8 (Commercial Catalytic Reactions No. 2), Commercial Catalytic Reactions I)", edited by Japan Catalyst Society, p. 196, 1985, Japan). Furthermore, the electrolytic oxidation reaction is also applicable to a carbon monoxide insertion reaction (carbonylation reaction), which is a variant of the oxidative addition reaction.

Hereinbelow, an explanation will be made with respect to the prior art of the production of a chemical compound by the electrolytic oxidation reaction, taking the carbonylation reaction as an example.

In general, for overcoming a thermodynamic disadvantage, a carbonylation reaction is performed in the presence of oxygen while by-producing water. Such an ordinary carbonylation reaction which is performed without utilizing an electrolysis is represented by the following formula:

That is, the carbonylation reaction is a reaction performed by subjecting two molecules of substrates each having a hydrogen atom (R—H and R'—H) and carbon monoxide to condensation in the presence of oxygen to thereby produce a condensation product while liberating hydrogen and converting the liberated hydrogen (hydrogen ions) into water.

The carbonylation reaction is generally performed by using a catalyst. Examples of such catalysts include the elements of the Groups 8, 9, 10 and 11 of the Periodic Table, such as palladium, and compounds of these elements.

As a substrate (R—H and/or R'—H), a wide variety of compounds can be used. Examples of substrates include organic compounds, such as an olefin (e.g. a polyene, such as a diene), an alcohol, an aromatic compound; and inorganic compounds, such as water. The substrates, R—H and R'—H, may be the same or different.

As examples of carbonylation reactions, there can be mentioned a reaction for the synthesis of an unsaturated carboxylic acid from an olefin and water, a reaction for the synthesis of an unsaturated ester from an olefin and an alcohol, a reaction for the synthesis of a dialkyl carbonate and a dialkyl oxalate from an alcohol, a reaction for the synthesis of a diaryl carbonate from phenol, and a reaction for the synthesis of a urea analogue and an oxalic diamide (oxamide) from an amine (see, for example, "Shokubai Koza Vol. 9 (Kogyo Shokubai Hanno-hen 3), Kogyo Shokubai Hanno II (Lecture on Catalysts Vol. 9 (Commercial Catalytic Reactions No. 3), Commercial Catalytic Reactions II)", edited by Japan Catalyst Society, p. 31, 1985, Japan).

The carbonylation reactions, which can be used to produce useful chemical compounds efficiently, are of great use in the chemical industry. However, the carbonylation reactions frequently pose problems, for example, in that a lowering of a catalyst activity occurs, that a corrosion of a reactor occurs due to the formation of a corrosive by-product derived from a catalyst, that a large amount of energy is consumed due to the use of high reaction temperature and high reaction pressure, that a danger of explosion is present due to the occurrence of a mixing of a starting material with oxygen or a mixing of a reaction product with oxygen, and that the selectivity for and yield of a desired compound are low.

Hereinbelow, these problems of the carbonylation reactions are specifically explained, taking as an example a reaction for the synthesis of a carbonic diester from an alcohol.

A carbonic diester is a useful compound, which is used as an additive for a gasoline and as a raw material for producing carbonates, carbamates, urethanes, and precision chemical compounds, such as pharmaceuticals and pesticides.

Examples of conventional methods for producing a carbonic diester include:

(I) a method in which phosgene is reacted with an alcohol in the presence of a base (see, for example, U.S. Pat. Nos. 2,787,631 and 4,335,051), (II) a method in which an alcohol is reacted with carbon monoxide in the liquid phase in the presence of oxygen and copper(I) chloride as a catalyst (see, for example, U.S. Pat. Nos. 4,218,391 and 4,318,862), (III) a method in which an alcohol is reacted with carbon monoxide in the presence of oxygen and a catalyst comprising a compound of an element of the platinum group, such as a palladium compound, and a copper compound, such as copper chloride (or a catalyst comprising a compound of a platinum group element, an alkali metal salt and copper(II) chloride) (see Examined Japanese Patent Application Publication No. 61-8816), and (IV) a method in which an alcohol is reacted with carbon monoxide in the gaseous phase in the presence of oxygen and a solid catalyst which is obtained by having copper chloride and an alkali metal compound (or an alkaline earth metal compound) carried on an activated carbon (see U.S. Pat. No. 5,004,827).

The commercial production of a carbonic diester has conventionally been conducted by using the method (I) above, since the method (I) has an economic advantage. However, the method (I) is disadvantageous from the viewpoint of safety, since the method (I) has a great defect in that it is necessary to use phosgene (which is poisonous) as a raw material. Further, the method (I) poses a problem that hydrogen chloride (which is highly corrosive) is by-produced during the reaction.

Therefore, as methods which do not use phosgene, the methods (II) to (IV) above have been proposed in which an alcohol is reacted with carbon monoxide in the presence of a catalyst and oxygen to thereby produce a carbonic diester. Since these methods do not use phosgene, prevention of environmental pollution and waste disposal can be simply conducted, so that the entire process becomes simple. Also, the cost of these methods has reached a level which can compete with the cost of the phosgene method. However, these methods (II) to (IV) still have many problems.

For example, the method (II) has the problem that a corrosion of a reactor occurs due to a by-produced, chlorine-containing compound. Therefore, in this method, it is necessary for the inside of the reactor to have a glass lining or an enamel lining, so that it becomes difficult to increase the size of the reactor.

Further, in this method (II), a high concentration of a catalyst and a high partial pressure of carbon monoxide are needed to achieve a satisfactory reaction rate. However, in this method, carbon dioxide is by-produced, and the by-produced carbon dioxide must be purged from the reaction system, and the purging of carbon dioxide inevitably causes a large loss of carbon monoxide and, hence, a lowering of the carbon monoxide partial pressure. Therefore, it becomes difficult to achieve a satisfactory reaction rate.

Further, because the method (II) uses, as a catalyst, a copper salt, which hardly dissolves in an organic solvent, the reaction system becomes a slurry (i.e., a liquid phase containing solids dispersed therein), and the produced carbonic diester is contained in the liquid phase. Therefore, this method has a defect in that it is necessary to perform additional steps for separating the produced carbonic diester from the solids by, for example, membrane separation or centrifugation separation.

In the method (III), the catalyst activity is higher than the catalyst activity achieved in the method (II). Therefore, in the method (III), the catalyst concentration and the carbon monoxide partial pressure need not be very high, as compared to the case of the method (II). However, this method has a problem in that a copper compound as an auxiliary catalyst is converted to a copper oxide, which is precipitated, and, also, by-produced water (by-produced when a carbonic diester is formed) converts the above-mentioned copper compound to a basic copper chloride, which is precipitated, so that it becomes difficult to produce a carbonic diester continuously and stably.

In the method (IV), which employs a gaseous phase reaction using a solid catalyst, the problem of the occurrence of a corrosive by-product, which problem accompanies a liquid phase reaction, can be avoided. However, the method (IV) has problems in that the catalyst activity becomes unsatisfactory, and that the catalyst activity becomes unstable since an insoluble metal compound, such as a basic copper chloride, is precipitated on the solid catalyst due to the presence of water which is by-produced. Thus, with this method, a carbonic diester cannot be produced stably and in high yield for a long time.

Further, the method (IV) uses a mixture of an alcohol, which is flammable, carbon monoxide and oxygen, and such a mixture is explosive, posing a problem from the viewpoint of safety.

For solving the above-mentioned problems, i.e., the problems that a lowering of a catalyst activity occurs, a corrosive by-product is formed, and the use of an explosive mixture is necessary, there have been proposed methods for producing a carbonic diester from an alcohol and carbon monoxide by an electrolytic reaction.

As mentioned above, the carbonylation reaction is thermodynamically disadvantageous, but can be performed relatively easily by utilizing an electrolysis. The carbonylation reaction performed by an electrolytic oxidation is represented by the following formula:

$$R\text{—}H + R'\text{—}H + CO \rightarrow R\text{—}CO\text{—}R' + H_2.$$

In the electrolytic carbonylation reaction, two molecules of substrates each having a hydrogen atom (R—H and R'—H) and carbon monoxide are subjected to condensation while liberating hydrogen. In this method, the liberated hydrogen is not converted to water and, therefore, molecular hydrogen is by-produced.

The electrolytic oxidation reaction for producing a carbonic diester is represented by the following formula:

$$R\text{—}OH + R'\text{—}OH + CO \rightarrow RO\text{—}CO\text{—}OR' + H_2.$$

Recently, the organic electrolysis reaction has attracted attention as a clean, chemical reaction technique which has high energy efficiency and which can utilize various resources. Therefore, remarkable progresses have been made in the technology for the synthesis of a chemical compound by using the organic electrolysis reaction. Specifically, various reaction techniques have been developed, for example, a membraneless electrolysis method, an anode reaction, a cathode reaction, an electrolysis method using a cation exchange membrane or anion exchange membrane, an emulsion electrolysis method, and a two-liquid-phase electrolysis method. Further, the electrolysis cells have been improved, and the improvement has enabled development of many reactions exhibiting high selectivity.

Examples of methods for producing a carbonic diester by an electrolytic reaction (electrolytic carbonylation method) include:

(V) a method in which electrolytic carbonylation of an alcohol is performed by using a halogen compound as an electrolyte (see J. Electro. Chem. Soc., 125 (12), 1954–1959, 1978, U.S.A.), and (VI) a method in which gaseous phase electrolytic carbonylation of an alcohol is performed by using an anode containing palladium chloride or copper(II) chloride (see, for example, Electrochimica Acta, Vol. 39, No. 14, 2109, 1994, Switzerland; J. Electro. Chem. Soc., 142 (1), 130–135, 1995, U.S.A.; and Unexamined Japanese Patent Application Laid-Open Specification No. 6-73582).

However, the method (V) above has a problem in that, for obtaining a carbonic diester in high yield and with high current efficiency, the reaction needs to be performed under a carbon monoxide pressure as high as 100 atm., so that the use of a reactor which can stand very high pressure is needed, and it is necessary to perform circulation of a high pressure gas. Therefore, this method is unsuitable for commercial practice.

The method (VI) was proposed by the present inventors. Specifically, the method (VI) is performed as follows. A reactor is provided comprising an electrolysis cell, a diaphragm containing an electrolyte solution, an anode containing palladium chloride or copper(II) chloride, and a cathode containing platinum black, wherein the diaphragm is disposed in the electrolysis cell to partition the cell into an anode compartment and a cathode compartment, and wherein the anode and the cathode are, respectively, disposed in the anode compartment and the cathode compartment. In operation, a voltage is applied between the anode and the cathode while introducing an alcohol and carbon monoxide to the anode compartment and introducing oxygen gas to the cathode compartment, thereby producing a carbonic diester.

The method (VI) has advantages in that it is free from the problems of a lowering of a catalyst activity and a corrosion of a reactor, and that, since oxygen is separated from an alcohol and carbon monoxide by a diaphragm disposed therebetween, formation of an explosive mixture can be prevented, thereby decreasing the danger of explosion. However, this method has a defect in that the selectivity for and yield of the carbonic diester obtained are low.

As apparent from the above, no method has conventionally been proposed which can be used for producing various compounds (e.g., a carbonic diester) efficiently, stably and safely by an electrolytic oxidation reaction (e.g., an electrolytic carbonylation reaction). Also, no reactor has conventionally been proposed which can exhibit an excellent performance when used for producing a compound by an electrolytic oxidation reaction.

SUMMARY OF THE INVENTION

In this situation, the present inventors have made extensive and intensive studies with a view toward developing a reactor for producing various chemical compounds (e.g., a carbonic diester) efficiently, stably and safely by an electrolytic oxidation reaction (e.g., an electrolytic carbonylation reaction). As a result, it has unexpectedly been found that various chemical compounds (e.g., a carbonic diester) can be produced efficiently, stably and safely by performing an electrolytic oxidation reaction (e.g., an electrolytic carbonylation reaction) by using an organic electrolysis reactor for performing an electrolytic oxidation reaction of a system comprising a substrate and a reductant, wherein the organic electrolysis reactor comprises: a casing; an anode which comprises an anode active material and which is ion-conductive or active species-conductive; a cathode which comprises a cathode active material and which is ion-conductive or active species-conductive; and means for applying a voltage between the anode and the cathode, wherein the means for applying a voltage is disposed in the outside of the casing and connected to the anode and the cathode, wherein the anode and the cathode are disposed in spaced relationship in the casing to partition the inside of the casing into an intermediate compartment between the anode and the cathode, and an anode compartment on the outside of the anode, and wherein the intermediate compartment has an inlet for an electrolyte solution and a substrate, and the anode compartment has an inlet for a reductant. The present invention has been completed, based on this novel finding.

Accordingly, it is an object of the present invention to provide an organic electrolysis reactor for producing various chemical compounds (e.g., a carbonic diester) efficiently, stably and safely by an electrolytic oxidation reaction (e.g., an electrolytic carbonylation reaction).

It is another object of the present invention to provide a method for producing a chemical compound by using the above-mentioned organic electrolysis reactor.

The foregoing and other objects, features and advantages of the present invention will be apparent from the following detailed description and appended claims taken in connection with the accompanying drawings.

BRIEF DESCRIPTION OF THE DRAWINGS

In the drawings:

In FIG. 1 trough FIG. 3, like parts and portions are designated by like numerals.

Description of Reference Numerals

1: Anode compartment
2: Intermediate compartment
3: Cathode compartment
4: Anode
5: Cathode
6: Inlet for carbon monoxide
7: Inlet for methanol and an electrolyte solution
8: Lead wire
9: Ammeter
10: Constant-voltage generator
11: Outlet for hydrogen
12: Outlet for carbon monoxide
13: Inlet for helium
21: Metal mesh
22: Teflon support plate A
23: Teflon support plate B
24: Teflon spacer
25: Silicone spacer

DETAILED DESCRIPTION OF THE INVENTION

In one aspect of the present invention, there is provided an organic electrolysis reactor for performing an electrolytic oxidation reaction of a system comprising a substrate and a reductant, comprising:

a casing;
an anode which comprises an anode active material and which is ion-conductive or active species-conductive;
a cathode which comprises a cathode active material and which is ion-conductive or active species-conductive; and
means for applying a voltage between the anode and the cathode, wherein the means for applying a voltage is disposed in the outside of the casing and connected to the anode and the cathode,
wherein the anode and the cathode are disposed in spaced relationship in the casing to partition the inside of the casing into an intermediate compartment between the anode and the cathode, and an anode compartment on the outside of the anode,
the intermediate compartment having an inlet for an electrolyte solution and a substrate, and the anode compartment having an inlet for a reductant.

For easy understanding of the present invention, the essential features and various preferred embodiments of the present invention are enumerated below.

1. An organic electrolysis reactor for performing an electrolytic oxidation reaction of a system comprising a substrate and a reductant, comprising:

a casing;
an anode which comprises an anode active material and which is ion-conductive or active species-conductive;
a cathode which comprises a cathode active material and which is ion-conductive or active species-conductive; and
means for applying a voltage between the anode and the cathode, wherein the means for applying a voltage is disposed in the outside of the casing and connected to the anode and the cathode,
wherein the anode and the cathode are disposed in spaced relationship in the casing to partition the inside of the casing into an intermediate compartment between the anode and the cathode, and an anode compartment on the outside of the anode,
the intermediate compartment having an inlet for an electrolyte solution and a substrate, and the anode compartment having an inlet for a reductant.

2. A method for producing a chemical compound by performing an electrolytic oxidation reaction of a system comprising a substrate and a reductant, which comprises:

providing the organic electrolysis reactor of item 1 above; and
performing the following steps (1) to (4) in either order, or simultaneously with respect to at least two steps thereof,
(1) introducing an electrolyte solution to the intermediate compartment,
(2) introducing a substrate to the intermediate compartment,
(3) introducing a reductant to the anode compartment, and
(4) actuating the means for applying a voltage between the anode and the cathode, thereby producing a chemical compound from the substrate and the reductant.

3. The method according to item 2 above, wherein the electrolytic oxidation reaction is an electrolytic carbonylation reaction of a substrate, which produces a carbonyl compound while by-producing hydrogen gas at the cathode, wherein the hydrogen gas is discharged to the outside of the intermediate compartment through the cathode.

4. The method according to item 3 above, wherein the electrolyte solution comprises at least one compound selected from the group consisting of phosphoric acid, a perhalogenic acid, an ammonium perhalogenate, an alkali metal halide, an alkali metal perhalogenate, a quaternary tetraalkyl ammonium halide and a quaternary tetraalkyl ammonium perhalogenate.

5. The method according to item 3 above, wherein the reductant is carbon monoxide.

6. The method according to item 5 above, wherein the substrate is an alcohol and the carbonyl compound produced is a carbonic diester.

Hereinbelow, the present invention is described in detail.

The organic electrolysis reactor of the present invention is a reactor for performing an electrolytic oxidation reaction of a system comprising a substrate and a reductant.

By using the organic electrolysis reactor of the present invention, various electrolytic oxidation reactions can be performed. For example, the reactor of the present invention is suitable for performing oxidation of an alkane (production of an alcohol or a ketone), oxidation of an alcohol (production of an aldehyde, a ketone, or an ester), epoxidation of an olefin, oxidation of a benzylic site or an allylic site (introduction of an alkoxy group, a carboxyl group or the like), oxidation of an aromatic ring of an aromatic hydrocarbon (e.g., production of benzoquinone from benzene, phenol or hydroquinone, or an oxidative coupling between aromatic rings), oxidation of a sulfur compound (such as, a thiol, a sulfide, or a disulfide), and oxidation of a nitrogen compound (e.g., production of a hydrazine derivative or a diazo compound from an amine, or production of a nitroso compound, an azoxy compound or an oxime from hydroxylamine).

The organic electrolysis reactor of the present invention can also be suitably used for performing an oxidative addition reaction by utilizing an electrolysis, with respect to such an oxidative addition reaction as is conventionally, usually performed by a non-electrolytic method. Examples of oxidative addition reactions include the Wacker reaction for the synthesis of an aldehyde and a ketone from an olefin (e.g. a polyene, such as a diene; these examples of olefins can also apply to the terms "olefin" mentioned below), acetoxylation of an olefin or an aromatic hydrocarbon, cyanation of an olefin or an aromatic hydrocarbon, chlorination of an olefin or an aromatic hydrocarbon, a coupling reaction of an olefin or an aromatic hydrocarbon, and a reaction for the synthesis of an ester from an alcohol.

Further, the organic electrolysis reactor of the present invention can also be suitably used for performing a carbon monoxide insertion reaction (carbonylation reaction) by utilizing an electrolysis, that is, for performing an electrolytic carbonylation reaction.

The electrolytic carbonylation reaction is represented by following formula:

R—H+R'—H+CO→R—CO—R'+H$_2$.

As mentioned above, it is difficult to cause a non-electrolytic carbonylation reaction to proceed because the reaction is thermodynamically disadvantageous, but it is relatively easy to cause the electrolytic carbonylation reaction to proceed.

In the electrolytic carbonylation reaction, a wide variety of compounds can be used as a substrate (R—H and/or R'—H). Examples of substrates include organic compounds, such an olefin, an alcohol, and an aromatic compound; and inorganic compounds, such as water.

Examples of electrolytic carbonylation reactions which can be performed by using the organic electrolysis reactor of the present invention include:

a reaction for the synthesis of an unsaturated carboxylic acid from an olefin and water, a reaction for the synthesis of an unsaturated ester from an olefin and an alcohol, a reaction for the synthesis of a dialkyl carbonate from an alcohol, a reaction for the synthesis of a diaryl carbonate from phenol, a reaction for the synthesis of an oxalic diester from an alcohol, a reaction for the synthesis of a urea analogue from an amine, and a reaction for the synthesis of an oxalic diamide from an amine.

The organic electrolysis reactor of the present invention comprises:

a casing;

an anode which comprises an anode active material and which is ion-conductive or active species-conductive;

a cathode which comprises a cathode active material and which is ion-conductive or active species-conductive; and means for applying a voltage between the anode and the cathode, wherein the means for applying a voltage is disposed in the outside of the casing and connected to the anode and the cathode.

The anode and the cathode are disposed in spaced relationship in the casing to partition the inside of the casing into an intermediate compartment between the anode and the cathode, and an anode compartment on the outside of the anode. The intermediate compartment has an inlet for an electrolyte solution and a substrate, and the anode compartment has an inlet for a reductant.

The shape and size of and the material for the casing of the reactor are not particularly limited and can be appropriately selected in accordance with the type and scale of the intended electrolytic oxidation reaction, and the types of the reagents used. Generally, the size of the casing is selected so that the intermediate compartment has a volume of from about 1 cm$^3$ to about 10 m$^3$. The volume of the anode compartment can be appropriately selected in accordance with the volume of the intermediate compartment.

When an electrolytic oxidation reaction is performed by using the organic electrolysis reactor of the present invention, by-production of a gas may occur depending on the type of the reaction. For example, as described above, hydrogen gas is by-produced in the electrolytic carbonylation reaction. For recovering such a by-produced gas, the organic electrolysis reactor of the present invention may further comprise a cathode compartment on the outside of the cathode. The volume of the cathode compartment can be appropriately selected in accordance with the volume of the intermediate compartment.

The anode used in the present invention comprises an anode active material and is ion-conductive or active species-conductive. The cathode used in the present invention comprises a cathode active material and is ion-conductive or active species-conductive. The term "active species" used herein in connection with the anode means a reactive chemical species which is derived from a reductant and which moves through the anode from the anode compartment toward the intermediate compartment. The term "active species" used herein in connection with the cathode means a reactive chemical species which is by-produced in the electrolytic oxidation reaction and which moves through the cathode from the intermediate compartment toward the cathode compartment.

In the present invention, each of the anode active material and the cathode active material can be selected from various materials. It is preferred that each of the anode active material and the cathode active material comprises at least one material selected from the group consisting of the metals of the Groups 1 to 14 of the Periodic Table, compounds of these metals, and electrically conductive carbonaceous materials.

Examples of compounds of the metals of the Groups 1 to 14 of the Periodic Table include a metal oxide; a metal hydroxide; a metal halide; a metal salt, such as a nitrate, a sulfate, an acetate, or a phosphate; and a complex, such as a carbonyl complex or an acetylacetonato complex. These compounds can be used individually or in combination. The Periodic Table mentioned herein is that prescribed in the IUPAC (International Union of Pure and Applied Chemistry) nomenclature system (1989).

As the electrically conductive carbonaceous material, there can be mentioned various types of carbonaceous materials having electric conductivity. Examples of electrically conductive carbonaceous materials include an activated carbon, a carbon black, acetylene black, graphite, a carbon fiber, and a carbon whisker. These electrically conductive carbonaceous materials can be used individually or in combination.

When a metal and/or a metal compound is used in combination with an electrically conductive carbonaceous material, it is preferred that the electrode (anode and/or cathode) is prepared by a method in which a particulate metal and/or a particulate metal compound is homogeneously mixed with a particulate, electrically conductive carbonaceous material, or a method in which a metal and/or a metal compound is caused to be carried on a particulate, electrically conductive carbonaceous material. These methods are preferred from the view-point of obtaining an electrode having a uniform composition and excellent electrical conductivity.

When a metal and/or a metal compound is used in combination with an electrically conductive carbonaceous material for preparing an electrode, it is preferred that the weight ratio of the former (in terms of the metal) to the total weight of the former and the latter is 0.01 to 50% by weight, more advantageously 0.1 to 30% by weight.

The anode active material and the cathode active material can be appropriately selected in accordance with the type of the intended electrolytic oxidation reaction.

In many cases, an oxidation reaction can be performed by any of a non-electrolytic method and an electrolytic method. Therefore, the selection of the anode active material and the cathode active material can be made, referring to the information on what substance can be used as a catalyst when the intended oxidation reaction (or an oxidation reaction equivalent to the intended oxidation reaction) is performed by a non-electrolytic method.

In the present invention, when the organic electrolysis reactor of the present invention is used for performing the above-mentioned various oxidation reactions (for example, oxidation of an alkane, oxidation of an alcohol, epoxidation of an olefin, oxidation of a benzylic site, oxidation of an allylic site, oxidation of an aromatic ring of an aromatic hydrocarbon, oxidation of a sulfur compound, and oxidation of a nitrogen compound), the oxidative addition reaction, or the electrolytic carbonylation reaction, it is preferred that the anode active material comprises at least one material selected from the group consisting of the metals of the Groups 8, 9, 10, 11 and 14 of the Periodic Table, compounds of these metals, and electrically conductive carbonaceous materials.

On the other hand, it is preferred that the cathode active material comprises at least one material selected from the group consisting of metals, such as iron, cobalt, nickel, gold, silver, copper, ruthenium, platinum, osmium, rhodium, iridium and palladium, compounds of these metals, and electrically conductive carbonaceous materials.

In the present invention, when the organic electrolysis reactor of the present invention is used for performing an oxidative addition reaction by utilizing an electrolysis or for performing the electrolytic carbonylation reaction, it is more preferred:

that the anode contains a mixture of at least one metal selected from the group consisting of palladium and copper, and/or a compound of the at least one metal, and an electrically conductive carbonaceous material, and that the cathode contains a mixture of at least one metal selected from the group consisting of iron, cobalt, nickel, copper, ruthenium, platinum and palladium, and/or a compound of the at least one metal, and an electrically conductive carbonaceous material.

It is especially preferred:

that the anode contains a mixture of a palladium and/or a palladium compound, and an electrically conductive carbonaceous material, and that the cathode contains a mixture of a platinum and/or a platinum compound, and an electrically conductive carbonaceous material.

In the present invention, when the organic electrolysis reactor of the present invention is used for producing a carbonic diester, it is preferred that the anode contains palladium chloride and a carbon fiber, and that the cathode contains a platinum black, graphite and a carbon fiber. The content of palladium chloride in the anode is preferably from 0.5 to 12 $\mu$mol, more preferably to 2 to 6 $\mu$mol, relative to 50 mg of the carbon fiber.

It is also preferred that the anode and the cathode contain a water repellent. As described below, a water repellent exhibits the effect to improve the reaction efficiency, especially when the reductant is in the gaseous form. Examples of water repellents include polytetrafluoroethylene (PTFE), tetrafluoroethylene oligomer (TFEO), graphite fluoride $((CF)_n)$ and pitch fluoride (FP).

It is preferred that the water repellent is used in an amount of from 1 to 250% by weight, more advantageously 25 to 100% by weight, based on the weight of the anode active material or cathode active material used.

In the case of the production of a carbonic diester, when the anode contains palladium chloride and a carbon fiber, it is preferred that the anode contains PTFE (as water repellent) in an amount of from 10 to 200% by weight, more advantageously 20 to 100% by weight, based on the total weight of the palladium chloride and the carbon fiber.

If desired, the anode and the cathode may also contain solid catalysts, such as silica, silica-alumina, zeolite and heteropolyacids. These solid catalysts may contain the above-mentioned metal elements.

With respect to the method for preparing the anode and the cathode, there is no particular limitation. The anode and the cathode can be prepared by the conventional methods. Since a water repellent also serves as a binding agent, an anode (or cathode) in a sheet form can be produced by a method in which a water repellent is mixed with an anode active material (or cathode active material) and optionally a solid catalyst, and the resultant mixture is molded into a sheet form by hot-pressing.

With respect to the means for applying a voltage between the anode and the cathode, there is no particular limitation, and conventional, voltage-applying means can be used.

By using the above-described organic electrolysis reactor of the present invention to perform an electrolytic oxidation reaction, various chemical compounds (e.g., a carbonic diester) can be produced safely and efficiently. Hereinbelow, an explanation will be made on the method of the present invention for producing a chemical compound by performing an electrolytic oxidation reaction using the organic electrolysis reactor of the present invention.

In the present invention, a chemical compound can be produced by a method comprising:

providing the above-mentioned reactor; and performing the following steps (1) to (4) in either order, or simultaneously with respect to at least two steps thereof, (1) introducing an electrolyte solution to the intermediate compartment, (2) introducing a substrate to the intermediate compartment, (3) introducing a reductant to the anode compartment, and (4) actuating the means for applying a voltage between the anode and the cathode, thereby producing a chemical compound from the substrate and the reductant.

In the present invention, as described above, a compound can be produced by performing an electrolytic oxidation reaction of a system comprising a substance and a reactant.

In the present invention, various electrolyte solutions can be used. However, it is preferred to use a weak or strong electrolyte solution which is acidic, neutral or alkaline.

Examples of electrolyte solutions include solutions obtained by dissolving, in an appropriate solvent, any of the following electrolytes: an acid, such as hydrochloric acid, sulfuric acid, phosphoric acid or a perhalogenic acid, or a salt thereof; a halide or a hydroxide of an alkali metal; a quaternary tetraalkyl ammonium halide or a quaternary tetraalkyl ammonium perhalogenate; and ammonia. These electrolytes can be used individually or in combination. As a solvent, there can be mentioned water, and a non-aqueous solvent, such as an alcohol, acetic acid, acetone or acetonitrile. These solvents can be used individually or in combination.

Further, as described below, at least a part of the solvent can be used as a substrate. For example, in the case of an electrolytic carbonylation reaction for producing a carbonic diester from a substrate alcohol, when an alcohol is used as a solvent for the electrolyte, a part of the solvent can also serve as a substrate.

Further examples of electrolyte solutions include water glass, city water and industrial water. These electrolyte solutions can be used individually or in combination.

In addition, if desired, a catalyst which is effective for the intended reaction can be dispersed in the electrolyte solution. As such a catalyst, there can be mentioned various metals or various metal compounds. Preferred examples of catalysts include metals which are selected from the Groups 1 to 16 of the Periodic Table, and compounds of the metals. Depending on the type of the intended reaction, silica, silica-alumina, zeolite and a heteropolyacid may also be dispersed as a catalyst in the electrolyte solution.

When an electrolytic carbonylation reaction is performed by using the organic electrolysis reactor of the present invention, it is preferred that the electrolyte solution comprises at least one compound selected from the group consisting of phosphoric acid, a perhalogenic acid, an ammonium perhalogenate, an alkali metal halide, an alkali metal perhalogenate, a quaternary tetraalkyl ammonium halide and a quaternary tetraalkyl ammonium perhalogenate.

As examples of perhalogenic acids, perchloric acid and periodic acid can be mentioned.

As an example of an ammonium perhalogenate, ammonium perchlorate can be mentioned.

As examples of alkali metal halides, sodium chloride, sodium bromide and sodium iodide can be mentioned.

As examples of alkali metal perhalogenates, sodium perchlorate and sodium periodate can be mentioned.

Examples of quaternary tetraalkyl ammonium halides include tetramethyl ammonium chloride, tetramethyl ammonium bromide, tetramethyl ammonium iodide, tetraethyl ammonium chloride, tetrapropyl ammonium chloride, tetrabutyl ammonium chloride and tetrahexyl ammonium chloride.

Examples of quaternary tetraalkyl ammonium perhalogenates include tetramethyl ammonium perchlorate, tetraethyl ammonium perchlorate, tetrapropyl ammonium perchlorate and tetrabutyl ammonium perchlorate.

The substrate can be appropriately selected in accordance with the intended reaction. For example, in the case of the electrolytic carbonylation reaction, examples of substrates include an olefin, an alcohol, a phenolic compound and an amine. These substrates can be used individually or in combination.

Examples of olefins include linear or branched olefins, such as ethylene, propylene, butene, pentene, hexene, heptene, octene, decene, 3-methyl-1-butene, 2,3-dimethyl-1-butene and allyl chloride; cyclic olefins, such as cyclopentene, cyclohexene, cycloheptene, cyclooctene and cyclodecene; and aryl-substituted olefins, such as styrene and α-methylstyrene.

By subjecting these olefins to an electrolytic carbonylation reaction in the presence of water, unsaturated carboxylic acids can be obtained.

Examples of alcohols include saturated or unsaturated aliphatic alcohols, such as methanol, ethanol, n-propanol, isopropanol, n-butanol, s-butanol, t-butanol, n-pentanol, n-hexanol, n-heptanol, allyl alcohol and crotyl alcohol; saturated or unsaturated alicyclic alcohols, such as cyclopentanol, cyclohexanol, cycloheptanol, methylcyclohexanol, cyclohexene-3-ol and cyclohexene-4-ol; polyhydric alcohols, such as ethylene glycol, propylene glycol, trimethylene glycol, 1,3butanediol, 1,2-cyclohexanediol and 1,4-cyclohexanediol; and aryl-substituted alcohols, such as benzyl alcohol, salicyl alcohol and benzhydrol.

By subjecting these alcohols to an electrolytic carbonylation reaction, a dialkyl carbonate or a dialkyl oxalate can be obtained.

When a dialkyl carbonate is produced by performing an electrolytic carbonylation reaction using the organic electrolysis reactor of the present invention, it is preferred that the substrate is a monohydric alcohol, such as methanol or ethanol.

By subjecting a mixture of an alcohol (selected from those mentioned above) and an olefin (selected from those mentioned above) to an electrolytic carbonylation reaction, an alkyl ester of an unsaturated carboxylic acid can be obtained.

Examples of phenols include phenol, cresol, xylenol, naphthol, anthrol (hydroxyanthracene) and derivatives thereof (a compound formed by replacing a hydrogen atom of the aromatic ring by an alkyl group, an aryl group, a halogen atom, a sulfonic acid group or the like).

By subjecting these phenols to an electrolytic carbonylation reaction, a diaryl carbonate or a diaryl oxalate can be obtained.

Examples of amines include aliphatic amines, such as methylamine, ethylamine, propylamine, butylamine, dimethylamine, diethylamine, cyclopentylamine, cyclohexylamine, cycloheptylamine and cyclooctylamine; and aromatic amines, such as aniline and toluidine.

By subjecting these amines to an electrolytic carbonylation reaction, urea analogues or oxalic diamides (oxamides) can be obtained.

The substrate need not be purified and can be used in the form of mixtures thereof with other organic compounds.

With respect to the method for introducing the electrolyte solution and the substrate to the intermediate compartment, there is no particular limitation. Examples of methods for the introduction of the electrolyte solution and the substrate include a method in which the electrolyte solution is first introduced to the intermediate compartment and, then, the substrate is introduced to the intermediate compartment; and a method in which the substrate and the electrolyte solution are simultaneously introduced (i.e., a mixture of them is introduced) to the intermediate compartment.

The concentration of the substrate in the electrolyte solution introduced to the intermediate compartment is preferably 0.1 to 100% by weight, more preferably 1 to 30% by weight, based on the total weight of the substrate and the electrolyte solution.

The reductant can be appropriately selected in accordance with the type of the intended electrolytic oxidation reaction.

The reductant used in the present invention is not particularly limited except that the reductant is required to have the ability to donate an electron. Examples of usable reductants include hydrogen, carbon monoxide, an alcohol, an aldehyde, a hydroquinone, a saturated hydrocarbon, an unsaturated hydrocarbon, an aromatic compound, an amine and water.

For example, in the case of an electrolytic carbonylation reaction, carbon monoxide is used as a reductant.

The reductant need not be purified and can be used in the form of mixtures thereof with other compounds. For example, when carbon monoxide is used as a reductant, carbon monoxide can be used in the form of a mixture with another gas, such as nitrogen gas, helium gas or argon gas.

The flow rate of the reductant which is introduced to the reactor can be selected in accordance with the size of the reactor. It is preferred that the flow rate of the reductant is 0.1 ml/min to 10,000 ml/min, more advantageously 1 ml/min to 1,000 ml/min.

An electrolytic oxidation reaction can be caused to proceed by providing conditions wherein a voltage is applied between the anode and the cathode, and the electrolyte solution and the substrate are contacted with the anode and the cathode, and the reductant is contacted with the anode. The voltage applied is usually in the range of from about 0.1 to about 10 V, preferably 0.5 to 7 V.

In the present invention, the electrolytic oxidation reaction is usually performed at a reaction temperature of from −20 to 200° C., preferably −5 to 150° C.

In the present invention, the pressure for the electrolytic oxidation reaction may be any of the atmospheric pressure, a superatmospheric pressure and a reduced pressure. The superatmospheric pressure is preferably selected from the range of from more than 1 atm to 100 atm. The reduced pressure is preferably not less than $10^{-2}$ torr.

The reaction time is not particularly limited and can be appropriately selected in accordance with the desired values of the selectivity for and yield of the desired product. Usually, the reaction time is selected from the range of from several seconds to several hours.

The mode of the reaction is not particularly limited. The reaction can be performed batchwise or continuously. The continuous operation of the reaction can be performed as follows. Appropriate equipment for continuous operation of the reactor is attached to the reactor of the present invention. During the reaction, the substrate and the electrolyte solution are continuously introduced to the intermediate compartment, while continuously withdrawing a reaction mixture formed in the intermediate compartment from the bottom of the intermediate compartment.

When an electrolytic oxidation reaction is performed by the above-described method, a reaction mixture containing a reaction product is produced in the intermediate compartment. From the reaction mixture, the reaction product can be separated by a conventional separation method, such as distillation or extraction. Thus, the reaction product can be purified to a desired purity.

When an electrolytic oxidation reaction which involves by-production of a gas (for example, an electrolytic carbonylation reaction which involves by-production of hydrogen gas) is performed by using the organic electrolysis reactor of the present invention which further comprises a cathode compartment on the outside of the cathode, the by-produced gas may be collected in the cathode compartment and recovered. If desired, the cathode compartment may have an inlet for an inert gas, such as nitrogen, helium or argon, and the recovery of the by-produced gas may be performed by a method in which an inert gas is introduced to the cathode compartment through the above-mentioned inlet to dilute the by-produced gas, and the diluted by-produced gas is recovered.

Hereinbelow, the mechanism of the electrolytic oxidation reaction performed by using the organic electrolysis reactor of the present invention will be explained with reference to FIG. 1, taking as an example the production of dimethyl carbonate from methanol by an electrolytic carbonylation reaction.

Figure 1:
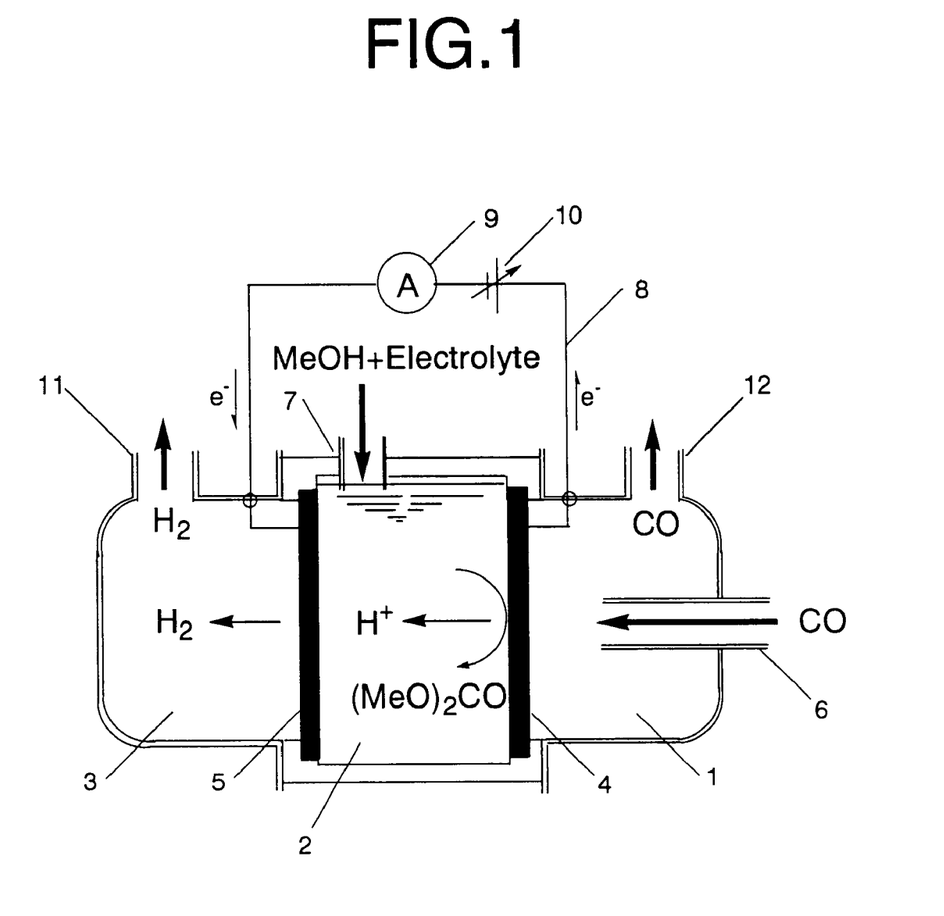
FIG. 1 is a diagram showing the principle of the reaction which is performed by the method of the present invention using the organic electrolysis reactor of the present invention, in which dimethyl carbonate is produced from methanol and carbon monoxide.

FIG. 1 is a diagram showing the principle of the reaction which is performed by the method of the present invention using the organic electrolysis reactor of the present invention, in which dimethyl carbonate is produced from methanol and carbon monoxide.

For convenience's sake, FIG. 1 shows that "Electrolyte" is introduced through inlet 7. However, the term "Electrolyte" in FIG. 1 means "Electrolyte solution".

The anode 4 and the cathode 5 are disposed in spaced relationship in the casing to partition the inside of the casing into an intermediate compartment 2 between the anode 4 and the cathode 5, and an anode compartment 1 on the outside of the anode 4.

In an electrolytic carbonylation reaction, hydrogen gas is by-produced. In the reactor shown in FIG. 1, for the purpose of collecting the by-produced hydrogen gas, a cathode compartment 3 is provided on the outside of the cathode 5.

The intermediate compartment 2 has an inlet for an electrolyte solution and a substrate, namely an inlet 7 for an electrolyte solution and methanol.

The anode compartment 1 has an inlet for a reductant, namely an inlet 6 for carbon monoxide.

The cathode compartment 3 has an outlet for by-produced hydrogen gas, namely an outlet 11 for hydrogen gas.

A metal mesh is disposed on the outside of each of the anode 4 and the cathode 5, and the anode 4 and the cathode 5 are connected to the output terminals of the constant-voltage generator 10 through a lead wire 8.

For producing dimethyl carbonate from methanol by using the reactor shown in FIG. 1 to perform an electrolytic carbonylation reaction, methanol and an electrolyte solution are introduced to the intermediate compartment 2 through the inlet 7 for methanol and an electrolyte solution, and carbon monoxide is introduced to the anode compartment 1 through the inlet 6 for carbon monoxide.

When the operation of the reactor has been started, a zone in which a gaseous phase, a liquid phase and a solid phase coexist, i.e., a so-called "three-phase zone", is formed in each of the anode 4 and the cathode 5. The production of dimethyl carbonate occurs in the three-phase zone in the anode 4, and the by-production of hydrogen gas occurs in the three-phase zone in the cathode 5.

Carbon monoxide (gaseous phase) introduced to the anode compartment 1 moves through the anode 4, so that a three-phase zone is formed in which the gaseous phase, the anode 4 (solid phase), the electrolyte solution (liquid phase) and methanol (liquid phase) are contacted with each other.

In the three-phase zone, a reaction represented by the formula (1) below occurs to form dimethyl carbonate, protons and electrons.

$$2\text{MeOH} + \text{CO} \rightarrow (\text{MeO})_2\text{CO} + 2\text{H}^+ + 2e^- \quad (1)$$

Dimethyl carbonate as a desired product is accumulated in the intermediate compartment 2.

The proton moves through the electrolyte solution and methanol in the intermediate compartment 2 toward the cathode 5.

The electron flows to the cathode 5 through the lead wire 8 and the constant-voltage generator 10.

In the cathode 5, a zone is formed in which the cathode 5 (solid phase), the electrolyte solution (liquid phase) and methanol (liquid phase) are contacted with each other. In this zone, the above-mentioned proton and electron are reacted with each other to form hydrogen gas (gaseous phase), as represented by the formula (2) below.

$$2\text{H}^+ + 2e^- \rightarrow \text{H}_2 \quad (2)$$

As a result of the reaction, a three-phase zone is formed in the cathode 5. The hydrogen produced moves through the cathode 5 and is collected in the cathode compartment 3 and then discharged or recovered through the outlet 11 for hydrogen.

As described above, in the reactor of the present invention, movement of a reactive chemical species (active species) to the three-phase zone occurs in both the anode 4 and the cathode 5. Therefore, in the present invention, it is required that both the anode 4 and the cathode 5 be ion-conductive or active species-conductive.

The above-explained principle of the reaction involved in the method of the present invention is not limited to the reaction for producing a carbonic diester, but can also essentially apply to other various electrolytic oxidation reactions which can be performed by using the reactor of the present invention.

The water repellent which may be incorporated in the anode and the cathode exhibits the effect to improve the efficiency of the electrochemical reaction in the three-phase zone, especially when the reductant is in the gaseous form. Therefore, when a reductant in the gaseous form is used, it is preferred that the anode contains a water repellent. Also, when an electrolytic oxidation reaction involving by-production of a gas at the cathode is performed, it is preferred that the cathode contains a water repellent.

The organic electrolysis reactor of the present invention having the above-mentioned structure is advantageous not only in that various electrolytic oxidation reactions, such as an electrolytic carbonylation reaction for producing a carbonic diester, can be performed efficiently and economically, and the selectivity for the desired product can be improved, but also in that there is no need for complicated operations. Further, the reactor of the present invention is free from the problems of the occurrence of a degradation of a catalyst and the occurrence of the by-production of a corrosive by-product.

Further, by using the reactor of the present invention, an electrolytic oxidation reaction can be caused to proceed under moderate conditions. Therefore, there is no need for a high reaction temperature and a high reaction pressure, so that consumption of a large amount of energy can be avoided.

In the present invention, no oxidant, such as oxygen, is used. Further, a contacting between the reductant and the substrate does not occur except for the contacting therebetween for the formation of the above-mentioned three-phase zone, so that formation of an explosive mixture does not occur.

It is considered that the reason why the efficiency and the selectivity can be improved in the present invention is as follows.

In the organic electrolysis reactor of the present invention, the substrate (e.g., methanol) and the reductant (e.g., carbon monoxide) are introduced to separate sites in the reactor, that is, they are, respectively, introduced to the intermediate compartment and the anode compartment. The intermediate compartment and the anode compartment are separated from each other by the anode disposed therebetween, so that a contacting between the substrate and the reductant does not occur except for the contacting therebetween for the formation of the above-mentioned three-phase zone. As a result, the activities of the substrate and the reductant can be increased.

Therefore, the reason why the efficiency and the selectivity can be improved is believed to reside in an improvement in the activities of the substrate and the reductant.

BEST MODE FOR CARRYING OUT THE INVENTION

The present invention will be described in more detail with reference to Examples and Comparative Examples, which should not be construed as limiting the scope of the present invention.

EXAMPLE 1

By the method described below, dimethyl carbonate was produced from methanol and carbon monoxide.

0.3 mg of palladium chloride (manufactured and sold by Wako Pure Chemical Industries, Ltd., Japan), 50 mg of a carbon fiber powder (manufactured and sold by Showa Denko K. K., Japan) and 17 mg of a polytetra-fluoroethylene (PTFE) powder (manufactured and sold by Daikin Industries, Ltd., Japan) were mixed together. The resultant mixture was then subjected to hot pressing at 120° C. to mold it into a round sheet (thickness: about 1 mm, diameter: about 25 mm), to thereby obtain an anode.

On the other hand, 20 mg of a platinum black (manufactured and sold by Wako Pure Chemical Industries, Ltd., Japan), 100 mg of a graphite powder (manufactured and sold by Wako Pure Chemical Industries, Ltd., Japan), 10 mg of a carbon fiber powder (which was the same as mentioned above) and 5 mg of a PTFE powder (which was the same as mentioned above) were mixed together. The resultant mixture was then subjected to hot pressing at 120° C. to mold it into a round sheet (thickness: about 1 mm, diameter: about 25 mm), to thereby obtain a cathode.

Then, the thus obtained anode and cathode were securely disposed in a casing, and then respectively connected to the output terminals of a constant-voltage generator (KIKUSUI PAB32-1.2A, manufactured and sold by Kikusui Kogyo, Japan) through a gold lead wire, thereby obtaining a reactor.

Figure 2:
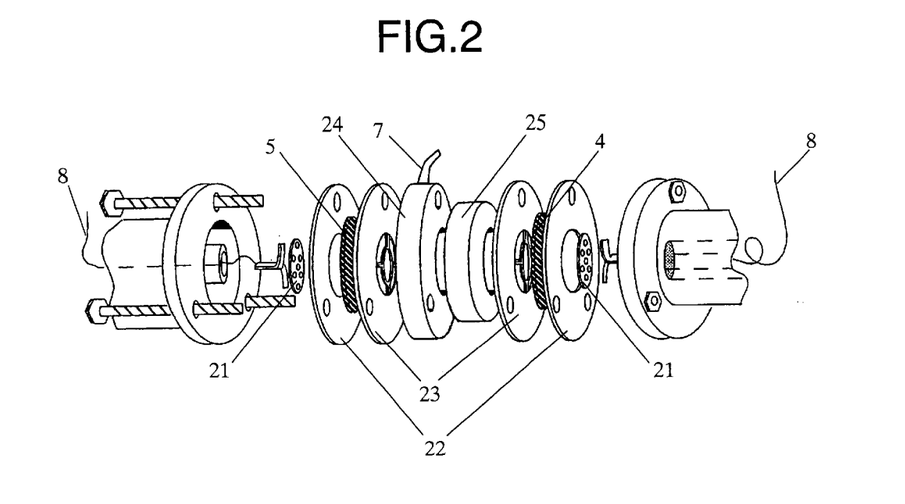
FIG. 2 is an exploded view of the organic electrolysis reactor used in the Examples.
Figure 3:
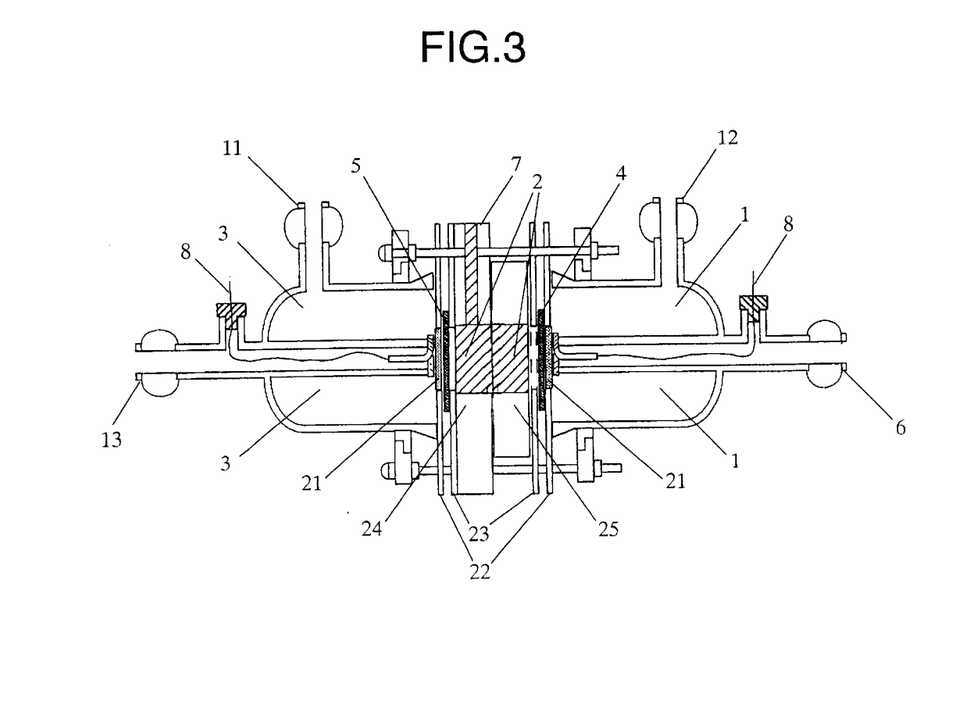
FIG. 3 is a diagrammatic view showing the inside of the organic electrolysis reactor shown in FIG. 2.

The thus produced reactor is shown in FIG. 2 and FIG. 3. The reactor has a construction adapted for producing dimethyl carbonate from methanol by an electrolytic carbonylation reaction.

The anode 4 and the cathode 5 are disposed in spaced relationship in the casing to partition the inside of the casing into an intermediate compartment 2 between the anode 4 and the cathode 5, and an anode compartment 1 on the outside of the anode 4.

In an electrolytic carbonylation reaction, hydrogen gas is by-produced. In the reactor shown in FIG. 2 and FIG. 3, for the purpose of collecting the by-produced hydrogen gas, a cathode compartment 3 is provided on the outside of the cathode 4.

The intermediate compartment 2 has an inlet 7 for methanol and an electrolyte solution.

The anode compartment 1 has an inlet 6 for carbon monoxide.

The cathode compartment 3 has an outlet 11 for hydrogen gas.

A metal mesh 21 is disposed on the outside of each of the anode 4 and the cathode 5, and the anode 4 and the cathode 5 are, respectively, connected to the out-put terminals of the constant-voltage generator 10 through a lead wire 8.

The volume of the intermediate compartment 2 is about 4 ml.

By using the above-described reactor, an electrolytic reaction was performed as follows. 4 ml of methanol containing 1.1 M phosphoric acid was put into the intermediate compartment 2, and an electrolytic reaction was performed by applying a voltage of 3.5 V between the anode 4 and the cathode 5 at 25° C. for 1 hour while introducing carbon monoxide gas under the atmospheric pressure to the anode compartment 1 at a flow rate of 15 ml/min and introducing helium gas under the atmospheric pressure to the cathode compartment 3 at a flow rate of 10 ml/min.

During the reaction, the potential difference between the anode 4 and the cathode 5 was measured by a potentiometer (ELECTRON METER HE-104, manufactured and sold by Hokuto Denko Corporation, Japan), and the current flowing between these electrodes was measured by a non-resistance ammeter (ZERO SHUNT AMMETER HM-104, manufactured and sold by Hokuto Denko Corporation, Japan), and the quantity of electricity having flowed between these electrodes was measured by a coulomb meter (COULOMB METER HF-210, manufactured and sold by Hokuto Denko Corporation, Japan).

The resultant reaction mixture (the liquid obtained in the intermediate compartment 2) was analyzed by gas chromatography. The analysis showed that dimethyl carbonate had been produced. The analytical conditions of the gas chromatography are shown below.

Apparatus: gas chromatograph Model GC-14AFP, manufactured and sold by Shimadzu Corporation, Japan (including a flame ionization detector (FID))

Column: capillary column ULBON HR-20M (0.25 mm×25 m), manufactured and sold by Shinwa Kakou, Japan Carrier gas: helium Flow rate: 20 ml/min Analysis mode: maintained at 40° C. for 5 min; then, temperature-elevated to 230° C. at a rate of 10° C./min; and, then, maintained at 230° C. for 5 min.

Before the gas chromatography analysis of the sample (reaction mixture), 2 μmol of naphthalene as an internal standard was added to the sample.

The amounts of dimethyl carbonate and by-products in the reaction mixture (μmol), the production efficiency of dimethyl carbonate (current efficiency)(%), and the quantity of electricity (C) having flowed from the anode 4 to the cathode 5 are shown in Table 1.

The current efficiency can be calculated by the following formula.

Current efficiency (%) =

$$\frac{2 \text{ (number of electrons)} \times \text{Amount of DMC (mol)} \times 100}{\text{Quantity of electricity (C)} \div 96500 \text{ (C/mol)}}$$

In Table 1, the meanings of the abbreviations of the names of compounds are as shown below.

| | |
|---|---|
| phosphoric acid | $H_3PO_4$ |
| tetramethyl ammonium bromide | $Me_4NBr$ |
| tetraethyl ammonium bromide | $Et_4NBr$ |
| tetrapropyl ammonium bromide | $Pr_4NBr$ |
| tetrabutyl ammonium bromide | $Bu_4NBr$ |
| tetrahexyl ammonium bromide | $Hx_4NBr$ |
| tetraethyl ammonium perchlorate | $Et_4NClO_4$ |
| tetrapropyl ammonium perchlorate | $Pr_4NClO_4$ |
| tetrabutyl ammonium perchlorate | $Bu_4NClO_4$ |
| ammonium perchlorate | $NH_4ClO_4$ |
| sodium perchlorate | $NaClO_4$ |
| dimethyl carbonate | DMC |
| dimethyl oxalate | OxDM |
| dimethoxymethane | DMM |
| methyl formate | MF |

On the other hand, the gas obtained in the cathode compartment 3 was directly sampled by using a gas syringe and analyzed by gas chromatography. The analysis showed that hydrogen gas had been produced. The analytical conditions of the gas chromatography are as shown below.

Apparatus: gas chromatograph Model GC-8ATP, manufactured and sold by Shimadzu Corporation, Japan (including a thermal conductivity detector (TCD))

Column: glass column having an inner diameter of 3 mm and a length of 2 m (containing an activated carbon ("Active Carbon 60/80", manufactured and sold by GL Science, Japan) packed therein as a stationary phase)

Carrier gas: argon

Flow rate: 40 ml/min

Analysis mode: isothermal analysis at 70° C.

EXAMPLES 2 and 3

The same procedure as in Example 1 was repeated except that a voltage of 1.7 V (Example 2) or 5.0 V (Example 3) was applied between the anode and the cathode. The results are shown in Table 1.

EXAMPLES 4 to 15

The same procedure as in Example 1 was repeated except that, in stead of phosphoric acid, the below-mentioned electrolytes were individually used in the concentrations shown in Table 1: tetramethyl ammonium bromide, tetraethyl ammonium bromide, tetrapropyl ammonium bromide, tetrabutyl ammonium bromide, tetrahexyl ammonium bromide, tetraethyl ammonium perchlorate, tetrapropyl ammonium perchlorate, tetrabutyl ammonium perchlorate, ammonium perchlorate, and sodium perchlorate. The results are shown in Table 1.

EXAMPLE 16

The same procedure as in Example 13 was repeated except that the amount of palladium chloride was changed to 0.6 mg. The results are shown in Table 1.

TABLE 1

| Example No. | Electrolyte | Concentration (M) | Voltage applied (V) | Products (µmol) | | | | Current efficiency (%) | Quantity of electricity (C) |
|---|---|---|---|---|---|---|---|---|---|
| | | | | DMC | OxDM | DMM | MF | | |
| 1 | $H_3PO_4$ | 1.1 | 3.5 | 18.2 | 1.2 | 0.4 | 1.6 | 58.5 | 6.0 |
| 2 | $H_3PO_4$ | 1.1 | 1.7 | 4.0 | 0.3 | 0.5 | 1.9 | 43.1 | 1.8 |
| 3 | $H_3PO_4$ | 1.1 | 5.0 | 20.9 | 2.4 | 0.4 | 1.5 | 47.1 | 8.6 |
| 4 | $Me_4NBr$ | 0.05 | 3.5 | 46.7 | 0.2 | 2.5 | 5.7 | 45.2 | 19.9 |
| 5 | $Et_4NBr$ | 0.05 | 3.5 | 52.2 | 0 | 2.2 | 6.7 | 47.5 | 21.2 |
| 6 | $Pr_4NBr$ | 0.05 | 3.5 | 32.6 | 0 | 1.8 | 7.1 | 38.5 | 16.3 |
| 7 | $Bu_4NBr$ | 0.05 | 3.5 | 42.7 | 0 | 2.0 | 6.2 | 45.7 | 18.0 |
| 8 | $Hx_4NBr$ | 0.05 | 3.5 | 33.2 | 0 | 1.7 | 3.4 | 42.4 | 15.1 |
| 9 | $Et_4NClO_4$ | 0.05 | 3.5 | 62.0 | 6.9 | 2.3 | 3.0 | 61.4 | 19.5 |
| 10 | $Pr_4NClO_4$ | 0.05 | 3.5 | 46.3 | 11.7 | 3.0 | 2.4 | 52.1 | 17.1 |
| 11 | $Bu_4NClO_4$ | 0.05 | 3.5 | 51.1 | 2.4 | 1.7 | 2.2 | 58.5 | 16.9 |
| 12 | $NH_4ClO_4$ | 0.05 | 3.5 | 69.2 | 24.5 | 2.5 | 2.7 | 59.1 | 22.6 |
| 13 | $NaClO_4$ | 0.05 | 3.5 | 62.6 | 10.1 | 2.2 | 3.2 | 61.6 | 19.6 |
| 14 | $NaClO_4$ | 0.1 | 3.5 | 102.8 | 23.5 | 2.2 | 5.9 | 58.8 | 33.8 |
| 15 | $NaClO_4$ | 0.3 | 3.5 | 147.3 | 36.7 | 6.2 | 9.3 | 44.9 | 63.3 |
| 16 | $NaClO_4$ | 0.1 | 3.5 | 163.4 | 42.0 | 31.5 | 30.5 | 36.6 | 86.2 |

Comparative Example 1

The same procedure as in Example 1 was repeated except that the application of a voltage was not conducted. In this experiment, no reaction proceeded, and no formation of dimethyl carbonate was observed.

The results of this Comparative Example 1 clearly show that the reaction for producing dimethyl carbonate by using the reactor of the present invention is not an electrochemical cell reaction which proceeds spontaneously, but an electrolytic reaction which needs the application of a voltage.

Comparative Example 2

An anode and a cathode were obtained in the same manner as in Example 1, and each of them was cut, by using scissors, into a rectangle sheet having a geometrical surface area of 4.9 cm². The thus obtained anode and cathode were, respectively, connected to the output terminals of a constant-voltage generator (KIKU-SUI PAB32-1.2A, manufactured and sold by Kikusui Kogyo, Japan) through a gold lead wire. 40 ml of methanol containing 1.1 M phosphoric acid was put into a 100 ml separable flask and, then, the above-mentioned anode and cathode and the open end of a carbon monoxide introduction pipe were immersed in the methanol in the flask, and the lid was set on the flask. Then, an electrolytic reaction was performed by applying a voltage of 3.5 V between the anode and the cathode at 25° C. for 1 hour while stirring with a magnetic stirrer and introducing carbon monoxide gas under the atmospheric pressure through the carbon monoxide introduction pipe at a flow rate of 10 ml/min to effect a bubbling.

During the reaction, the potential difference between the anode and the cathode, the current flowing between these electrodes, and the quantity of electricity having flowed between these electrodes were measured in the same manner as in Example 1.

The resultant reaction mixture (the liquid obtained in the separable flask) was analyzed by gas chromatography in the same manner as in Example 1. The analysis showed that dimethyl carbonate had been produced.

The amount of dimethyl carbonate produced was 3 µmol. 10 µmol of methyl formate and 5 µmol of dimethoxymethane were by-produced. The current efficiency was 10%.

During the reaction, it was observed that a gas was formed at the cathode. The gaseous phase in the separable flask was sampled by using a gas syringe and analyzed by gas chromatography in the same manner as in Example 1. The analysis showed that the gas formed at the cathode was hydrogen gas.

The above-described results show that, with respect to the selectivity for and yield of a desired product, the reactor of the present invention is superior to the conventional reactors.

INDUSTRIAL APPLICABILITY

By using the organic electrolysis reactor of the present invention to perform an electrolytic oxidation reaction, such as an electrolytic carbonylation reaction, various useful chemical compounds, for example a carbonic diester, can be produced efficiently, stably and safely, with high selectivity under moderate conditions.

The organic electrolysis reactor of the present invention can solve the various problems of a non-electrolytic oxidation reaction which is performed by using a catalyst, i.e., the problems that a deterioration of a catalyst occurs, that the selectivity for and yield of a desired product become low, that complicated operations are necessary, and that a large amount of energy-is consumed.

For example, when the production of a carbonic diester from carbon monoxide and an alcohol by an electrolytic carbonylation reaction is performed by using the organic electrolysis reactor of the present invention, there can be obtained advantages not only in that the carbonic diester can be produced efficiently, with high selectivity and at low cost under moderate conditions, but also in that the reactor of the present invention can solve the various problems of the conventional methods for producing a carbonic diester, such as the problems that the use of phosgene (which is poisonous) is necessary, that a corrosion of a reactor by a by-produced chlorine-containing compound occurs, that a deterioration of a catalyst occurs, that there occurs formation of a dangerous, explosive mixture of a starting material with oxygen, and that the selectivity for and yield of a desired carbonic diester become low.

In the organic electrolysis reactor of the present invention, the substrate and the reductant are introduced to separate sites in the reactor, that is, they are, respectively, introduced to the intermediate compartment and the anode compartment, so that a direct contacting between the substrate and the reductant does not occur. As a result, the activities of the substrate and the reductant can be increased. The reason why the efficiency and the selectivity can be improved as described above is believed to reside in an improvement in the activities of the substrate and the reductant.

The organic electrolysis reactor of the present invention can be used not only for performing an electrolytic carbonylation reaction, but also for performing electrolytic oxidation reactions other than an electrolytic carbonylation reaction, such as oxidation of an alkane, oxidation of an alcohol, epoxidation of an olefin, oxidation of a benzylic site, oxidation of an allylic site, oxidation of an aromatic ring of an aromatic hydrocarbon, oxidation of a sulfur compound and oxidation of a nitrogen compound. In addition, the organic electrolysis reactor of the present invention can also be used for performing an oxidative addition reaction by electrolysis, with respect to such a type of oxidative addition reaction as conventionally, usually performed by a non-electrolytic method.

What is claimed is:

1. A method for producing a chemical compound by an electrolytic oxidation reaction of a system comprising a substrate and a reductant, which comprises:
    providing an organic electrolysis reactor comprising:
        a casing;
        an anode which comprises an anode active material and which is ion-conductive or active species-conductive;
        a cathode which comprises a cathode active material and which is ion-conductive or active species-conductive; and
        means for applying a voltage between said anode and said cathode, wherein said means for applying a voltage is disposed in the outside of the casing and connected to said anode and said cathode,
        wherein said anode and said cathode are disposed in spaced relationship in said casing to partition the inside of said casing into an intermediate compartment between said anode and said cathode, and an anode compartment on the outside of said anode,
        said intermediate compartment having an inlet for an electrolyte solution and a substrate, and
        said anode compartment having an inlet for a reductant; and
    performing the following steps (1) to (4) in either order, or simultaneously with respect to at least two steps thereof
        (1) introducing an electrolyte solution to said intermediate compartment,
        (2) introducing a substrate to said intermediate compartment,
        (3) introducing a reductant to said anode compartment, and
        (4) actuating said means for applying a voltage between said anode and said cathode,
    thereby performing an electrolytic oxidation reaction of a system comprising said substrate and said reductant to produce a chemical compound,
    wherein said electrolytic oxidation reaction is selected from the group consisting of:
        an oxidation reaction selected from the group consisting of oxidation of an alkane, oxidation of an alcohol, epoxidation of an olefin, oxidation of a benzylic site, oxidation of an allylic site, oxidation of an aromatic ring of an aromatic hydrocarbon, oxidation of a sulfur compound, and oxidation of a nitrogen compound,
        an oxidative addition reaction, and
        an electrolytic carbonylation reaction of a substrate, which produces a carbonyl compound while by-producing hydrogen gas at said cathode, wherein said hydrogen gas is discharged to the outside of said intermediate compartment through said cathode.

2. The method according to claim 1, wherein said electrolytic oxidation reaction is said electrolytic carbonylation reaction.

3. The method according to claim 2, wherein said electrolyte solution comprises at least one compound selected from the group consisting of phosphoric acid, a perhalogenic acid, an ammonium perhalogenate, an alkali metal halide, an alkali metal perhalogenate, a quaternary tetraalkyl ammonium halide and a quaternary tetraalkyl ammonium perhalogenate.

4. The method according to claim 2 or 3, wherein said reductant is carbon monoxide.

5. The method according to claim 4 wherein said substrate is an alcohol and said carbonyl compound produced is a carbonic diester.

* * * * *